United States Patent Office 3,365,320
Patented Jan. 23, 1968

3,365,320
PROCESS OF MAKING AN AQUEOUS
ADHESIVE
John J. Minelli, Old Forge, Pa., assignor to Eureka-Carlisle Company, a corporation of Delaware
No Drawing. Filed May 17, 1965, Ser. No. 456,500
6 Claims. (Cl. 106—133)

This invention relates generally to remoistenable gum coatings and the process for the preparation of such coatings and associated compositions.

Remoistenable adhesive gum coatings are necessary and desirable for a great number of applications upon various forms of webbing such as paper, cardboard, fabric and other sheet-like materials.

The particular problem which has been encountered in the coating of sheet and webbing surfaces with remoistenable glue and gum preparations is that a tendency to "curl" has been caused by the differential moisture absorbing properties of the paper or webbing and of the gum coating (the gum and the web sheeting material being of differing hygroscopicities). As the gum coating generally takes on more moisture from high humidity ambient air than does the paper or webbing to which it is bonded, the glue surface expands more than the sheeting which thus causes "curling" of the sheeting material away from the adhesive layer. On the other hand, if the coated sheet is subject to an atmosphere of low moisture content, the adhesive layer will lose more moisture and will contract more than the paper backing or webbing and hence the backing sheet will "curl" toward the adhesive side.

Briefly, the present invention is a process by which a remoistenable gum is coated or deposited on a web material in the form of discrete particles. A web so coated is free of curl.

A particular feature of the present invention is in the formation of a fine dispersion of microscopic particles of gum in a liquid medium comprising an organic solvent, water and resin emulsion. The resin emulsion is a dispersion of polymer particles in a colloidal state. The solvent causes the polymer particles to swell. When the gum is added to the liquid medium, the gum breaks down into smooth microscopic particles which are adsorbed onto the resin. As a result, the finely divided polymer particles are coated by the gum, thereby providing a colloidal suspension of finely divided gum particles in the liquid medium.

The composition is coated on a web material and is heated in order to remove the water and solvents from the gum coating. The product formed is then a discontinuous layer of discrete and individual articulated gum globules which have attached themselves to the backing material by reason of their own adhesive properties.

The gum must be broken down to microscopic particles when added to the liquid medium. Attempts to accomplish this through mechanical agitation alone involves large costs and is time-consuming. In addition, it is very difficult to form a consistent and reproducible dispersion of gum globules in the liquid medium.

In order to overcome the problems set forth in the last paragraph, it has been found essential that an electrolyte to be added to the liquid medium prior to the step of adding the gum to the liquid medium. It has been discovered that the addition of the electrolyte at this point not only greatly reduces the mechanical agitation period but in addition, provides a consistent and reproducible dispersion of gum globules in the liquid medium.

An object of the present invention is to provide a remoistenable adhesive gum coating on paper, cardboard, fabric and other sheet-like materials which is dimensionally stable when exposed to changing atmospheric conditions.

Another object of the present invention is to provide an adhesive gum coating comprising minute, discrete particles of gum.

Another object of the present invention is to provide an adhesive coating, as described in the preceding paragraph, wherein the discrete particles of gum are of colloidal size and are formed by a process which eliminates the need for mechanical grinding.

Another object of the present invention is to provide a coating, as described in the preceding paragraph, wherein a minimum amount of resin is utilized thereby minimizing interference with the adhesive.

Another object of the present invention is to provide a process for producing a remoistenable adhesive coating which process involves the addition of an electrolyte at a critical point in the process to provide a consistent and reproducible gum coating composition.

The process for obtaining a dispersion of finely divided water soluble gum particles in a water solvent mixture by the use of a water insoluble resin emulsion is as follows:

(1) The water insoluble organic resin emulsion, the water miscible and/or immiscible organic solvent and water are brought together and the mixture is heated to not less than 100° F. and preferably to slightly less than the vaporization temperature of the organic liquid used or slightly less than the decomposition temperature of the gum or of the resin emulsion and to whichever of these temperatures is the lowest. The mixture is agitated briskly for approximately ten minutes, but not to entrail air in the liquid mixture. The combining and heating may be carried out in an open top steam jacket kettle.

(2) A quantity of electrolyte is added to the heated resin emulsion and organic solvent composition while continuing to heat and agitate for approximately five minutes. The amount of electrolyte used is dependent upon the type of glue and the properties of the finished product.

(3) A quantity of the glue is then slowly added and agitation of the mixture is continued for approximately twenty to sixty minutes.

(4) The heat is then turned off and a quantity of room temperature organic solvent is added as needed, to dilute the heated mixture. Such solvent may be the same solvent as that added in step number 1, or may be another organic solvent. Agitation is continued for ten minutes and the temperature is reduced to room temperature for use. The appearance and consistency of the mixture at this time appears to be a colloidal dispersion or a finely divided dispersion of gum particles in the liquid medium.

(5) The product composition is then coated on the web sheeting and is heated in order to remove the water and solvent from the gum layer.

The above processes have been found advantageous in order to form a consistent and reproducible dispersion of gum globules in the liquid phase which all appear by microscopic studies, to be coated about a core portion of water insoluble resin.

The resin as used in step No. 1 of the process is a colloidal dispersion of resin particles in water. It is theorized that when the resin is placed in a mixture with a resin swellable solvent, the colloidal particles absorb solvent and swell to the point where they are actually larger than the particles in the emulsion state. It appears that the resin is only active as globule core forms when the mixing and heating has been carried out.

COMPONENTS

Adhesive component

The gum may be substances from the following group and mixtures thereof: animal glues such as bone or hide glue, fish glue, casein, vegetable glues including natural gums such as gum tragacanth, gum dammar, gum karaza, agar agar, gum arabic; manufactured vegetable glues such as starch and starch derivatives including dextrin, British gum, potato dextrin, chlorinated starch; mineral glues including silicate of soda; and synthetic glues including polyvinyl alcohol; dextrin, carboxy methyl cellulose and methyl and ethyl cellulose.

Water insoluble core material

The core material in its initially used state is a latex-type water emulsion of water insoluble polymers. With regard to general properties of such polymers the following factors appear of importance; the specific chemical structure of the polymer does not appear to be a critical factor. The same is true with the degree of polymerization. The major criticality does appear to be the particle size of the polymer globule in the latex-type emulsion. From the smallest particle sizes which will maintain a colloidal suspension (0.001 micron) up to 5 microns appear to be usable. The most satisfactory results have been obtained with particles in the size range 0.01–2 microns.

Many non-ionic emulsions, regardless of molecular weight, and having particle sizes below five microns will absorb the water miscible solvents described herein and show the necessary swelling effect. Such resins as copolymers of ethyl acrylate and methyl methacrylate with a particle size of 0.1 micron have been found to produce the desired globule coprecipitation. Other copolymers such as butadiene-styrene (GR–S rubber) as well as homopolymers of polyvinyl acetate are usable to produce the "non-curling" adhesive coating of this invention.

Other resinous materials which may be employed when in the latex-type emulsion state are the following: methyl acrylate resins, ethyl acrylate resins, butyl acrylate resins, polybasic acid polyhydric alcohol resins (Glyptals), low polymerization Bakelites, gutta-percha, polyethylene, polysulfide, and methyl and ethyl esters of hydrogenated abietic acid.

The water insoluble resin component may also include a small percentage of plasticizer if it is compatible with respect to the resin employed.

One of the properties which must be met by the particular resinous material used for the core portion of the coprecipitated globule is that the resin must be insoluble in water and also in the organic solvent, but must be swellable by the particular organic solvent used.

ORGANIC SOLVENTS

The solvents used should have the properties of swelling the latex-type emulsion resin component and should also have limited solubility for the water soluble gum. Such solvents as listed below can be used alone or in combination. Solvents of the following types have been found to work extremely well: lower alcohols such as methyl alcohol, ethyl alcohol, butyl alcohol, isobutyl alcohol, isopryopyl alcohol, propyl alcohol; lower ketones such as acetone, methyl, ethyl acetone; lower glycols such as methylene glycol, ethylene glycol, di-ethylene glycol, tri-ethylene glycol, tetra-ethylene glycol, propylene glycol, di-propylene glycol, hexylene glycol, 1, 5, pentanediol; 2 methyl, 2 ethyl 1, 3 propanediol; polypropylene (mol. wt. below 450); glycerine, hexanetriol; benzene, xylene, toluene, naphtha, methyl acetate, di-acetone.

Any of the above solvents alone or in combination may be utilized for the diluting step referred to above.

ELECTROLYTES

A number of electrolytes can be used and the following perform quite satisfactorily.

Acids: hydrochloric, sulfuric, phosphoric, acetic, citric, lactic, oxalic, salicylic and tartari maleic, fumaric, adipic and other food acidulents.

Salts: ammonium thiocyanate, urea, sodium bisulfite, sodium chloride, sodium nitrate, ammonium carbonate, sugar, and dodecyl benzene sulphonate, sodium lauryl sulphonate, and the like.

PROPORTIONS OF COMPONENTS

The general ranges of components based on 100 parts by weight of the water soluble adhesive component (gum) are the following: organic solvents 15 to 140 parts, water insoluble resin emulsion 2½ to 16 parts (solids basis), water 5–50 parts, electrolyte, 1 to 10 parts (1% to 7½% of the total), and diluting solvent 40 to 200 parts.

The range of parts by weight of water set forth above is considered to be a criticality of the present invention. Below 5 parts of water per 100 parts of adhesive, the composition presents the difficulty that the glue when dissolved in this small amount of water, will not be sufficiently moistened in the final form to sufficiently adhere to the sheeting web upon which the glue dispersion is applied. The glue particles rather than adhering to the sheeting material will remain on the surface only until handling attrition "dusts" them off. On the other hand if the water is increased beyond 50 parts per weight based on 100 parts of glue, the glue particles formed tend to coalesce and become an unworkable mass. This effect of adding a greater quantity of water than 50 parts may be partially overcome by adding an increasing amount of diluting solvent in order to further dilute the solids to liquid ratio.

There is an optimum range, also, associated with the addition of the diluting solvent as noted in the step 4. This solvent may be added in liberal quantities as long as the solids to liquids ratio remains in the range of 1/10 to 8.5/10. At the lower ratio the increased cost of the diluting solvent make the greater addition of diluting solvent economically unfeasible. Also, the coating applied to the sheet material is extremely thin and for some purposes not an adequate adhesive coat.

Beyond the higher ratios of solids to liquids, feasibility of application of the concentrated mixture becomes increasingly difficult and is thought to be economically and technically disadvantageous.

SPECIFIC EXAMPLES

Having described the invention in general term and listed the components, the specific examples of the glue composition by this unique process are the following:

*Example 1.*—Adjust heat of steam jacketed kettle to 140° F. and turn on stirring motor. Add and mix 500 pounds of methanol, 1,000 pounds of toluol, 168 pounds of RHoplex B-15 (which is 47%, water emulsion of water insoluble acrylic polymers) and 94 pounds of water in that order with heating to 140° F. Agitation is continued for fifteen minutes. At this point add 60 pounds of citric acid and mix for ten minutes. Slowly add 1,000 pounds of chrome glue (prepared by mixing animal glue with ammonium or potassium dichromate or with chrome alum) and continue heating 140° F. and mixing until glue is completely dispersed. This takes about forty-five minutes. At this stage, the mixture is a smooth creamy fluid containing a finely divided dispersion of gum particles. The heat is then turned off and 1,400 pounds of toluol is added. Agitation is continued for thirty minutes. The mixture is cooled to room temperature and coated upon a paper web with a smoothing rod and the paper is then heated from the reverse side of the webbing.

The resulting product is a discontinuous field of individual glue particles containing a center core of RHoplex B-15 and which were adhered to the paper web by reason the adhesive properties of the glue. This paper presented excellent wetting properties showed no tendency to "curl" upon great variations in the atmospheric humidity to which it was exposed.

*Example 2.*—The glue of Example 1 is replaced with precooked dextrine and the same process carried forth which resulted in a coating of the dextrine about the RHoplex B-15 core globules.

*Example 3.*—The process described in Example 1 is carried out by replacing the RHoplex B-15 with Derex 66000, a butadiene styrene polymer.

Substantially the same water soluble glue globules result which are coatable upon paper with substantially the same end product result.

*Example 4.*—The diluting solvent used in Example 1 is replaced with an equivalent quantity of acetone and substantially the same results are obtained.

*Example 5.*—The diluting solvent of Example 1 is replaced with methyl ethyl ketone and again the results reproduced.

*Example 6.*—The glue utilized in Example 1 was replaced with polyvinyl alcohol (medium viscosity grade). The resulting product shows the same identifiable characteristics as the coating produced by Example 1.

*Example 7.*—The water soluble core material of Example 1, RHoplex B-15, was replaced with Polycol 577G, a homopolymer polyvinyl acetate emulsion. The glue globules resulting were of substantially the same size and shape and of the same general characteristics as those produced by Example 1.

While the invention has been described, it will be understood that it is capable of further modifications and this application is intended to cover any variations, uses or adaptions of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention what I claim is:

1. A process for manufacture of an adhesive composition, including the steps of:
   (a) forming a latex type aqueous dispersion of water insoluble resin particles, said resin particles having a size range of between .001 micron to 5 microns;
   (b) swelling said resin particles by the addition of an organic solvent to said dispersion;
   (c) adding an electrolyte to the dispersion followed by the addition of a remoistenable adhesive, said remoistenable adhesive being added in an amount such that there is at least 5 parts by weight of water to 100 parts by weight of remoistenable adhesive and such that the solids to liquid ratio is in the range between 1 to 10 and 8.5 to 10, said remoistenable adhesive being selected from the group consisting of vegetable glues, animal glue, fish glue, mineral glue, dextrin, carboxy methyl cellulose, methyl and ethyl cellulose and polyvinyl alcohol;
   (d) agitating until the adhesive is completely dispersed.

2. A process as defined by claim 1, wherein said organic solvent is selected from the group consisting of: lower aliphatic alcohols, ketones, glycols (not more than 6 carbons), 1,5 pentanediol, 2 methyl, 2 ethyl, 1,3 propanediol, polypropylene (mol wt. below 450), glycerine, hexanetriol, benzene, xylene, toluene, naphtha, methyl acetate and di-acetone.

3. A process in accordance with claim 2, wherein said electrolyte is selected from the group consisting of ammonium thyocyanate, urea, sodium bisulfite, sodium chloride, sodium nitrate, ammonium carbonate, sugar and dodecyl benzene sulphonate and sodium lauryl sulphonate.

4. A process in accordance with claim 2, wherein said electrolyte is an acid selected from the group consisting of hydrochloric, sulfuric, phosphoric, acetic, citric, lactic, oxalic, salicylic and tartaric maleic, fumaric and adipic.

5. A process as defined by claim 3, wherein said resin particles are selected from the group consisting of copolymers of ethyl acrylate and methyl methacrylate, copolymer of butadiene-styrene, polyvinyl acetate, methyl acrylate, ethyl acrylate, butyl acrylate, gutta-percha, polyethylene, polysulfide and methyl and ethyl esters of hydrogenated abietic acid.

6. A process as defined by claim 4, wherein said resin particles are selected from the group consisting of copolymers of ethyl acrylate and methyl methacrylate, copolymer of butadiene-styrene, polyvinyl acetate, methyl acrylate, ethyl acrylate, butyl acrylate, gutta-percha, polyethylene, polysulfide and methyl and ethyl esters of hydrogenated abietic acid.

References Cited

UNITED STATES PATENTS

| | | | |
|---|---|---|---|
| 1,484,759 | 2/1924 | Crupi | 106—133 |
| 1,512,212 | 10/1924 | De Cew | 106—133 |
| 2,365,020 | 12/1944 | Stilwell | 260—8 |
| 3,069,370 | 12/1962 | Jensen et al. | 260—17.4 |
| 3,116,206 | 12/1963 | Brynko et al. | 260—8 |
| 3,200,091 | 8/1965 | Sederlund et al. | 260—8 |

WILLIAM H. SHORT, *Primary Examiner.*

E. M. WOODBERRY, *Assistant Examiner.*